(12) United States Patent
Ledbetter et al.

(10) Patent No.: US 11,016,989 B2
(45) Date of Patent: May 25, 2021

(54) SYSTEMS AND METHODS FOR AN AUTOMATED CONFIGURATION OF A NEW DATABASE ENGINE SERVER

(71) Applicant: Walmart Apollo, LLC, Bentonville, AR (US)

(72) Inventors: Joshua Ledbetter, Bentonville, AR (US); Craig Laine, Bella Vista, AR (US); Jeremy Bowman, Prairie Grove, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 198 days.

(21) Appl. No.: 15/659,833

(22) Filed: Jul. 26, 2017

(65) Prior Publication Data

US 2018/0032593 A1 Feb. 1, 2018

Related U.S. Application Data (60) Provisional application No. 62/367,440, filed on Jul. 27, 2016.

(51) Int. Cl.

| *G06F 16/27* | (2019.01) |
|---|---|
| *G06F 16/23* | (2019.01) |
| *G06F 16/25* | (2019.01) |
| *G06F 16/21* | (2019.01) |
| *G06F 8/61* | (2018.01) |
| *G06F 9/4401* | (2018.01) |

(52) U.S. Cl.
CPC ............. *G06F 16/27* (2019.01); *G06F 8/61* (2013.01); *G06F 9/4416* (2013.01); *G06F 16/21* (2019.01); *G06F 16/23* (2019.01); *G06F 16/25* (2019.01)

(58) Field of Classification Search
None
See application file for complete search history.

(56) References Cited

U.S. PATENT DOCUMENTS

| 5,878,408 A | 3/1999 | Van Huben et al. |
|---|---|---|
| 6,151,608 A | 11/2000 | Abrams |
| 6,256,635 B1 * | 7/2001 | Arrouye .............. G06F 9/44505 |

(Continued)

OTHER PUBLICATIONS

International Search Report and Written Opinion for corresponding International Application No. PCT/US2017/043872 dated Oct. 20, 2017; 12 pages.

(Continued)

*Primary Examiner* — Richard L Bowen
(74) *Attorney, Agent, or Firm* — Patterson Thuente Pedersen, P.A.

(57) ABSTRACT

Embodiments relate to systems and methods for the automated configuration of new database engine servers. In one embodiment, a method includes obtaining a database engine file directory and a backup file comprising database engine parameters from an existing database engine server, bundling the database engine file directory and backup file, placing the bundle on a new database engine server, determining at least one parameter of the new database engine server, updating at least one of the database engine parameters based on the determined at least one parameter, using the determined at least one parameter and the backup file to start the new database engine server, and validating the new database engine server.

19 Claims, 5 Drawing Sheets

(56) References Cited

U.S. PATENT DOCUMENTS

| | | | |
|---|---|---|---|
| 6,523,027 B1 | 2/2003 | Underwood | |
| 6,615,253 B1 * | 9/2003 | Bowman-Amuah | G06F 16/9574 709/219 |
| 7,379,996 B2 | 5/2008 | Papatla et al. | |
| 7,552,358 B1 * | 6/2009 | Asgar-Deen | G06F 11/1435 714/15 |
| 7,580,970 B2 | 8/2009 | Bank et al. | |
| 7,797,279 B1 * | 9/2010 | Starling | G06F 11/1451 707/641 |
| 7,797,404 B1 * | 9/2010 | Knight | H04L 41/0843 709/220 |
| 7,917,617 B1 | 3/2011 | Ponnapur et al. | |
| 8,214,353 B2 | 7/2012 | Inturi et al. | |
| 8,285,684 B2 | 10/2012 | Prahlad et al. | |
| 8,442,949 B1 | 5/2013 | Gunda et al. | |
| 8,881,139 B1 * | 11/2014 | Acacio | G06F 16/214 717/177 |
| 8,977,594 B2 | 3/2015 | Whitehead et al. | |
| 9,098,364 B2 | 8/2015 | Davis | |
| 9,201,883 B1 * | 12/2015 | Stickle | G06F 16/113 |
| 9,258,262 B2 | 2/2016 | Watt et al. | |
| 9,483,248 B2 * | 11/2016 | Ramasamy | G06F 8/656 |
| 9,600,545 B2 * | 3/2017 | Pryce | G06F 16/25 |
| 10,031,961 B1 * | 7/2018 | Wang | G06F 16/275 |
| 2003/0046441 A1 * | 3/2003 | Rau | G06F 8/71 719/315 |
| 2004/0122865 A1 | 6/2004 | Stahl et al. | |
| 2005/0091240 A1 | 4/2005 | Berkowitz et al. | |
| 2005/0149627 A1 * | 7/2005 | Schreter | H04L 29/12292 709/223 |
| 2006/0059253 A1 | 3/2006 | Goodman et al. | |
| 2007/0112834 A1 | 5/2007 | Farr et al. | |
| 2010/0024012 A1 | 1/2010 | Devine et al. | |
| 2012/0124168 A1 * | 5/2012 | Boerger | G06F 16/119 709/217 |
| 2014/0121861 A1 * | 5/2014 | Mood | G06F 9/44505 701/3 |
| 2014/0181040 A1 | 6/2014 | Montulli et al. | |
| 2015/0019195 A1 | 1/2015 | Davis | |
| 2015/0019488 A1 | 1/2015 | Higginson et al. | |
| 2015/0212896 A1 | 7/2015 | Pawar et al. | |
| 2015/0271014 A1 * | 9/2015 | Madama | H04L 41/0893 709/222 |
| 2015/0304417 A1 * | 10/2015 | Tan | H04L 67/1095 707/610 |
| 2016/0188377 A1 * | 6/2016 | Thimmappa | G06F 9/5072 718/104 |
| 2017/0169059 A1 * | 6/2017 | Horowitz | H04L 9/0891 |
| 2017/0171021 A1 * | 6/2017 | Angaluri | G06F 8/63 |
| 2018/0096043 A1 | 4/2018 | Ledbetter et al. | |

OTHER PUBLICATIONS

"Transferring Data Between Plesk Servers"; http://does.plesk.com/en-US/12.5/migration-guide/introduction.75496/?fileName=71244.htm 2 pages, retrieved May 24, 2016.

"Advanced Upgrade and Database Migration"; https://sc1.checkpoint.com/documents/R76/CP_R76_Installation_and_Upgrade_Guide-webAdmin/16535.htm 12 pages, retrieved May 24, 2016.

International Search Report and Written Opinion for PCT Application No. PCT/US2017/051547, dated Dec. 5, 2017, 12 pages.

Notification of the Preliminary Report on Patentability for Corresponding PCT Application No. PCT/US2017/043872, dated Feb. 2, 2019, 7 pages.

* cited by examiner

SYSTEMS AND METHODS FOR AN AUTOMATED CONFIGURATION OF A NEW DATABASE ENGINE SERVER

RELATED APPLICATION

The present application claims the benefit of U.S. Provisional Application No. 62/367,440 filed Jul. 27, 2016, which is hereby incorporated herein in its entirety by reference.

TECHNICAL FIELD

Embodiments relate generally to database management systems (DBMS) and more particularly to systems and methods for building new database systems.

BACKGROUND

Traditionally, installation of a database engine on a new server is time consuming and requires specialized knowledge of the software, hardware, and installation process. For example, a new installation of an Informix database engine on a server through manual installation can take several hours to complete, and requires myriad steps in order to satisfy a multi-page checklist. The traditional build process is therefore also subject to potential human error and non-optimized operation.

Therefore, there is a need for systems and methods to automatically configure new database engines on a server.

SUMMARY

In an embodiment, a method for automated configuration of a new database engine server comprises obtaining, from an existing database engine server, a database engine file directory and a backup file comprising database engine parameters; bundling the obtained database engine file directory and backup file; placing the bundle on a new database engine server; determining at least one parameter of the new database engine server; updating at least one of the database engine parameters based on the determined at least one parameter; using the determined at least one parameter and the backup file to start the new database engine server; and validating the new database engine server.

In an embodiment, a system for automated configuration of a new database engine server comprises an existing database engine server comprising a database engine file directory and a backup file comprising database engine parameters and configured to bundle the database engine file directory and the backup file; a repository server communicatively coupled with the existing database engine server to receive the bundled database engine file directory and backup file; and a new database engine server communicatively coupled with the repository server to retrieve the bundled database engine file directory and backup file and configured to determine at least one parameter of the new database engine server, update at least one of the database engine parameters based on the determined at least one parameter, and use the determined at least one parameter and the backup file to start operation.

In an embodiment, a system for automated configuration of a server engine comprises a first script including instructions that when executed on a first computing platform including first computing hardware of at least one first processor, a first memory operably coupled to the at least one first processor and configured to store instructions invoked by the at least one first processor, a first operating system implemented on the first computing hardware, and first input/output facilities, cause the first computing platform to implement: an archive module configured to generate a backup file of the first computing platform comprising first computing platform parameters, a file directory module configured to generate a file directory of the first computing platform, and a packaging module configured to package the backup file and the file directory into a first computing platform package; and a second script including instructions that when executed on a second computing platform including second computing hardware of at least one second processor, a second memory operably coupled to the at least one second processor and configured to store instructions invoked by the at least one second processor, a second operating system implemented on the second computing hardware, and second input/output facilities, cause the second computing platform to implement: an unpackaging module configured to unpackage the first computing platform package, a file directory module configured to build a file directory structure on the second computing platform according to the file directory, an engine configuration module configured to update the first computing platform parameters for the second computing platform to second computing platform parameters, and an archive command module configured to perform an archive restore from the backup file of the first computing platform using the second computing platform parameters.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION

Figure 1:
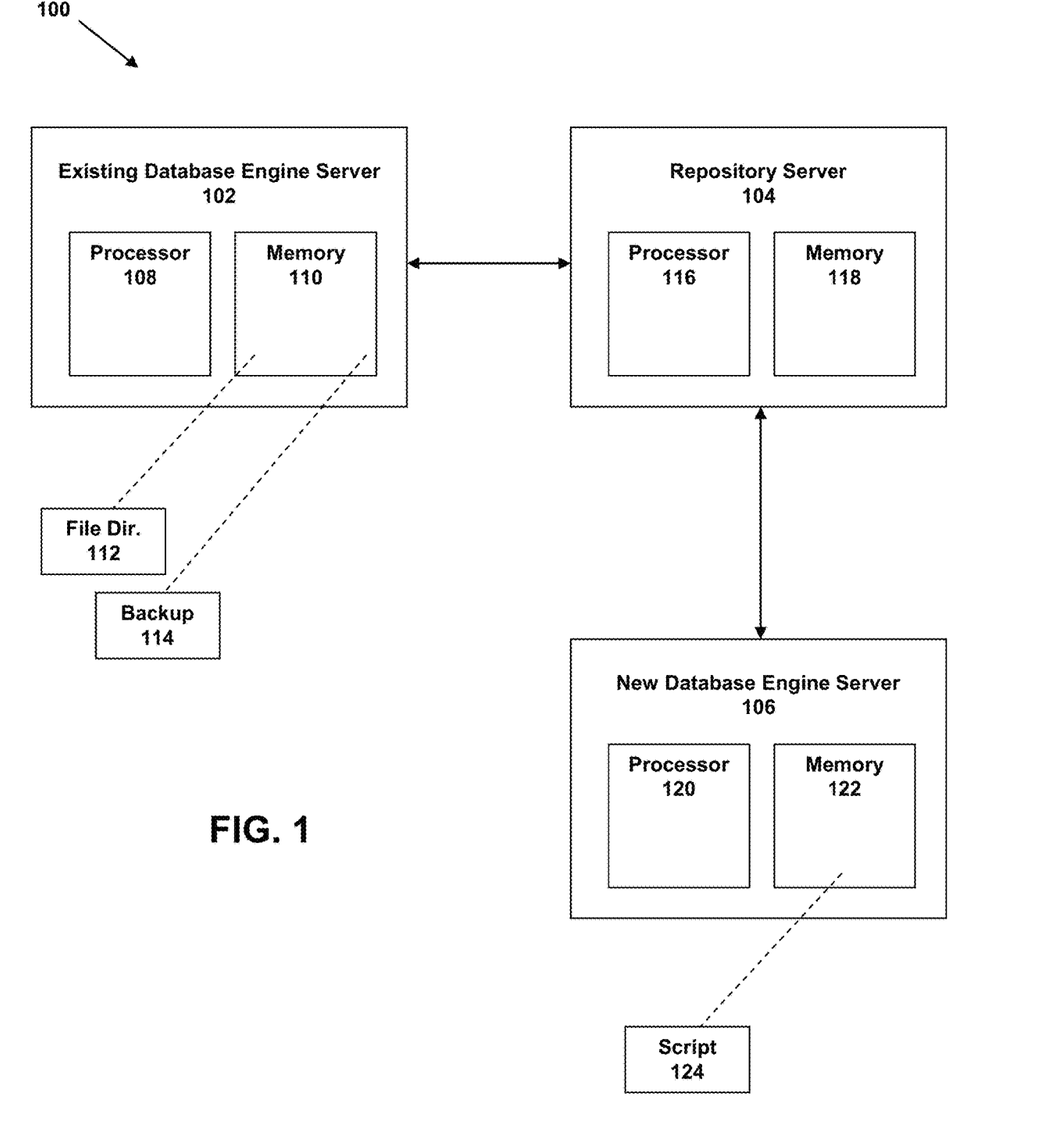
FIG. 1 is a block diagram of a system for automated configuration of a database engine server according to an embodiment.

Referring to FIG. 1, a system for the automated configuration of a new database engine server is depicted, according to an embodiment. System 100 generally comprises an existing database engine server 102, a repository server 104, and a new database engine server 106.

As will be described, system 100 and/or its components or subsystems can include computing devices, microprocessors, modules and other computer or computing devices, which can be any programmable device that accepts digital data as input, is configured to process the input according to instructions or algorithms, and provides results as outputs. In an embodiment, computing and other such devices discussed herein can be, comprise, contain or be coupled to a central processing unit (CPU) configured to carry out the instructions of a computer program. Computing and other such devices discussed herein are therefore configured to perform basic arithmetical, logical, and input/output operations.

Computing and other devices discussed herein can include memory. Memory can comprise volatile or non-volatile memory as required by the coupled computing device or processor to not only provide space to execute the instructions or algorithms, but to provide the space to store the instructions themselves. In embodiments, volatile memory can include random access memory (RAM), dynamic random access memory (DRAM), or static random access memory (SRAM), for example. In embodiments, non-volatile memory can include read-only memory, flash memory, ferroelectric RAM, hard disk, floppy disk, magnetic tape, or optical disc storage, for example. The foregoing lists in no way limit the type of memory that can be used, as these embodiments are given only by way of example and are not intended to limit the scope of the invention.

In embodiments, the system or components thereof can comprise or include various modules or engines, each of which is constructed, programmed, configured, or otherwise adapted, to autonomously carry out a function or set of functions. The term "engine" as used herein is defined as a real-world device, component, or arrangement of components implemented using hardware, such as by an application specific integrated circuit (ASIC) or field-programmable gate array (FPGA), for example, or as a combination of hardware and software, such as by a microprocessor system and a set of program instructions that adapt the engine to implement the particular functionality, which (while being executed) transform the microprocessor system into a special-purpose device. An engine can also be implemented as a combination of the two, with certain functions facilitated by hardware alone, and other functions facilitated by a combination of hardware and software. In certain implementations, at least a portion, and in some cases, all, of an engine can be executed on the processor(s) of one or more computing platforms that are made up of hardware (e.g., one or more processors, data storage devices such as memory or drive storage, input/output facilities such as network interface devices, video devices, keyboard, mouse or touchscreen devices, etc.) that execute an operating system, system programs, and application programs, while also implementing the engine using multitasking, multithreading, distributed (e.g., cluster, peer-peer, cloud, etc.) processing where appropriate, or other such techniques. Accordingly, each engine can be realized in a variety of physically realizable configurations, and should generally not be limited to any particular implementation exemplified herein, unless such limitations are expressly called out. In addition, an engine can itself be composed of more than one sub-engines, each of which can be regarded as an engine in its own right. Moreover, in the embodiments described herein, each of the various engines corresponds to a defined autonomous functionality; however, it should be understood that in other contemplated embodiments, each functionality can be distributed to more than one engine. Likewise, in other contemplated embodiments, multiple defined functionalities may be implemented by a single engine that performs those multiple functions, possibly alongside other functions, or distributed differently among a set of engines than specifically illustrated in the examples herein.

For example, existing database engine server 102 includes a processor 108 and a memory 110 operably coupled to processor 108. Memory 110 can comprise a database engine file directory 112 and a backup file 114. Existing database engine server 102 can be a general purpose database management storage system (DBMS) or relational DBMS as implemented by, for example, Oracle, IBM DB2, Microsoft SQL Server, PostgreSQL, MySQL, SQLite, Linux, or Unix solutions, in embodiments.

Database engine file directory 112 comprises one or more data structures configured to store a file system cataloging structure which contains references to other computer files on existing database engine server 102, and/or other directories on existing database engine server 102.

Backup file 114 is a backup of existing database engine server 102. In an embodiment, backup file comprises one or more data structures configured to store database engine parameters of existing database engine server 102. For example, backup file 114 can include configuration parameters for the database, including table-specific setup information and the amount of hardware-specific and software-specific resources to allocate to a database. In an embodiment, backup file 114 further comprises at least one database related to existing database engine server 102. For example, backup file 114 can comprise an initial onconfig file (for Informix server engines), a sqlhosts connectivity file (for Informix server engines), system databases, and log spaces. Database engine parameters can include:

SHMTOTAL—total memory accessible by the engine;

SHMVIRTSIZE—represents a quarter of the SHMTOTAL;

BUFFERPOOL—sets a 2 k and 16 k BUFFERPOOL with sizing depending on the SHMTOTAL; and DBSERVERNAME and DBSERVERALIASES—used to reflect the new server's naming convention and allows for connectivity through the sqlhosts file.

In embodiments, the aforementioned database engine parameters can be modified for Informix engine installations, as will be described.

In an embodiment, processor 108 can be configured to access memory 110 and, in particular, file directory 112 and backup file 114. Processor 108 can be configured to bundle, package, or otherwise compress file directory 112 and backup file 114 for transfer within system 100. As shown in FIG. 1, existing database engine server 102 is communicatively coupled with repository server 104 such that communications can be sent to repository server 104 and received from repository server 104. For example, the bundled file directory 112 and backup file 114 can be transferred to repository server 104 by processor 108 utilizing appropriate communications components.

Repository server 104 includes a processor 116 and a memory 118 operably coupled to processor 116. Similar to existing database engine server 102, repository server 104 can be a general purpose database management storage system (DBMS) or relational DBMS, in embodiments.

Repository server 104 is communicatively coupled with existing database engine server 102 such that communications can be sent to existing database engine server 102 and received from existing database engine server 102. For example, repository server 104 can be configured to receive the bundled file directory 112 and backup file 114. In particular, processor 116 can be configured to receive the bundled file directory 112 and backup file 114 and store file directory 112 and backup file 114 in memory 118. As further shown in FIG. 1, repository server 104 is also communicatively coupled with new server 106 such that communications can be sent by processor 116 to new server 106 and received from new server 106 by processor 116.

New database engine server 106 generally comprises a processor 120 and a memory 122 operably coupled to processor 120. Similar to existing database engine server 102 and repository server 104, new database engine server 106 can be a general purpose database management storage system (DBMS) or relational DBMS, in embodiments.

New database engine server 106 is communicatively coupled with repository server 104 such that communications can be sent to repository server 104 and received from repository server 104. In particular, processor 120 is configured to retrieve the bundled file directory 112 and backup file 114 from repository server 104. In one embodiment, processor 120 can ping repository server 104 for the bundled package, which can then be transmitted by repository server 104. In other embodiments, repository server 104 can transmit the bundled package ad-hoc without an initial request by processor 120.

In embodiments wherein existing database engine server 102 is configured to compress the bundled database engine file directory 112 and backup file 114, new database engine server 106 is configured to uncompress the bundled and compressed database engine file directory 112 and backup file 114. For example, processor 120 can be configured for decompression.

Processor 120 is further configured to determine at least one parameter of new database engine server 106. For example, at least one of a number of central processing units (CPUs), a total amount of memory, or a server name of the new database engine server can be determined. In an embodiment, processor 120 is further configured to update at least one of the database engine parameters from backup file 114 based on the determined at least one parameter. For example, new database engine server 106 can be configured to update at least one of an environment file, a host file, and/or a configuration file utilized in operation of new database engine server 106.

In an embodiment, processor 120 is further configured to utilize the determined at least 20 one parameter and the backup file to start operation of new database engine server 106.

In an embodiment, processor 120 can command new database engine server 106 to be cycled to validate operation. In embodiments, cycling can include a server reboot, running a test set of data, or other suitable validation operation.

In an embodiment, a script 124 can be utilized to automate any of the aforementioned processing. For example, script 124 can command processor 120 to retrieve the bundled file directory 112 and backup file 114, lay out the directory in memory 122, and update configuration files to reflect new database engine server 106 information. For example, for Informix engine installations, script 124 can modify onconfig and sqlhosts files to reflect new database engine server 106 hardware. In embodiments, the parameters SHMTOTAL, SHMVIRTSIZE, BUFFERPOOL, DBSERVERNAME, and DBSERVERALIASES can be modified by script 124 for Informix engine installations.

Script 124 can further be configured to command processor 120 to cycle new database engine server 106 to validate operation. As depicted in FIG. 1, script 124 is stored in memory 122. Likewise, script 124 can be executed by processor 120. However, in other embodiments, script 124 can be stored in existing database engine server 102 (memory 110) or repository server 104 (memory 118) and executed on those respective servers. In still other embodiments, script 124 can be stored and executed on a device separate from system 100, wherein the device is configured to access and command existing database engine server 102, repository server 104, and new database engine server 106.

For example, script 124 can utilize the following functions for Informix engine installations:

CheckInformix—Checks if Informix engine is online;
Untar—Unpacks database directories onto a new server;
UpdateTools—Unpacks new database tools onto a new server;
ValidateUser—Ensures appropriate database users are allowed on a new server;
AddGroups—Ensures appropriate database groups exist on a new server;
Links—Creates links with recently unpacked database directories on a new server;
ModifyEnv—Sets database user environment to information of a new server;
ModifyServices—Ensures etc/services file of new server has a standardized setup;
InstallGskit—Sets up gskit (Informix) installation on a new server;
UpdateSqlhosts—Updates a sqlhosts file (Informix) of a new server for appropriate connectivity;
UpdateOnconfig—Updates an onconfig file (Informix) of a new server to reflect the new hardware, such as: CPU number, total memory available, and/or server name. This information is used to calculate a number of onconfig parameters to ensure the new server is utilized efficiently.
Restore—Uses the backup file from the existing server with the changes mentioned above to initially bring up the database engine.
SetupCrontab—Sets up crontab of a new server for certain database tools to run on a schedule;
RunLS—Executes database tool for reporting of servers; and
ValidateInstall—Cycles server engine with database tools to ensure the server and the tools are properly configured before marking the new server as complete.

One skilled in the art will readily appreciate that other functions or combinations of functions can be utilized to build Informix engine servers or other variations of engine servers.

Figure 2:
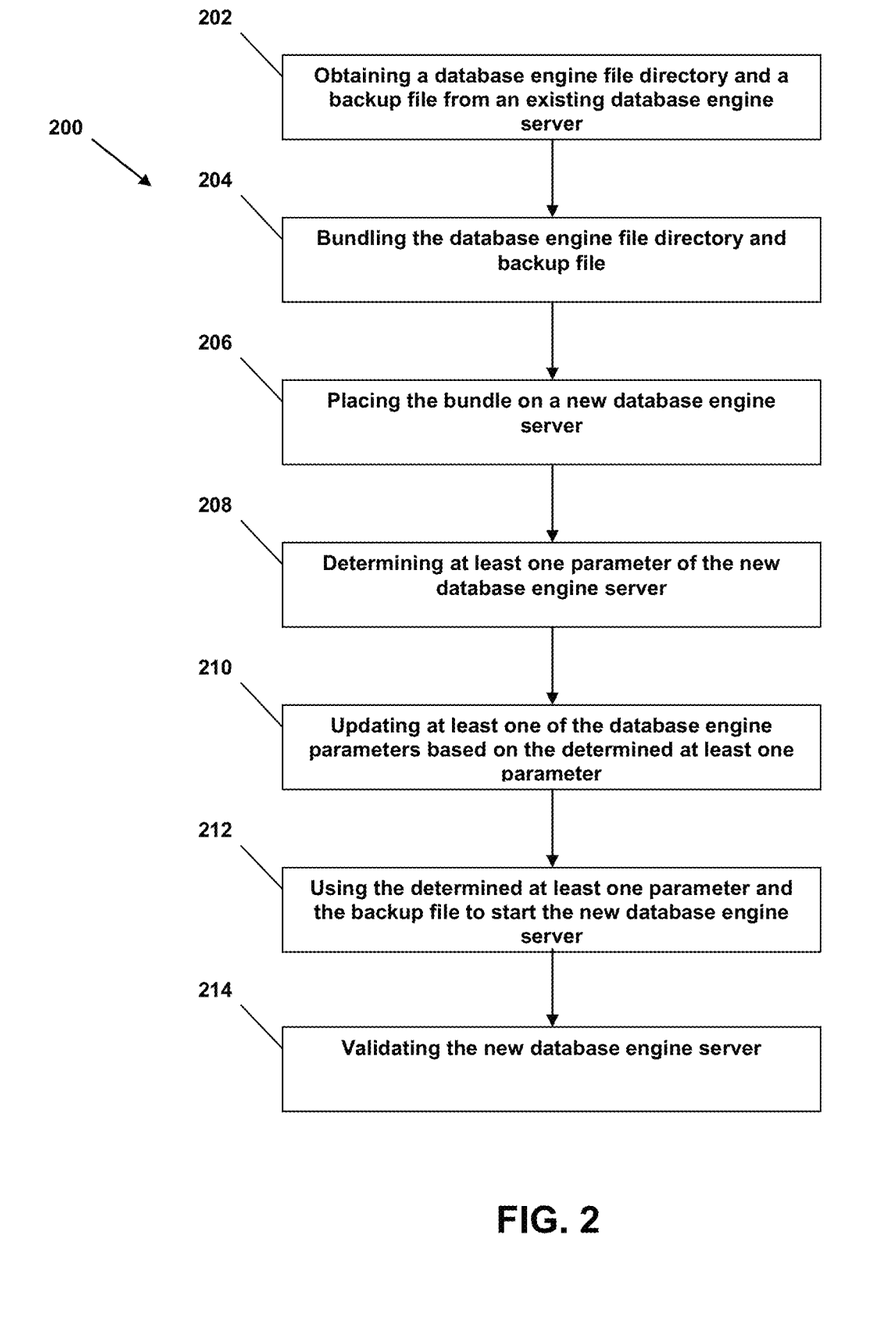
FIG. 2 is a flowchart of a method for automated configuration of a database engine server according to an embodiment.

Referring to FIG. 2, a flowchart of a method 200 for the automated configuration of a database engine server is depicted, according to an embodiment. At 202, method 200 obtains a database engine file directory and a backup file from an existing database engine server. For example, referring to FIG. 1, method 200 can identify database engine file directory 112 and backup file 114 from existing database engine server 102. In an embodiment, the back-up file comprises at least one database related to existing database engine server 102. In an embodiment of a Linux server, the database engine file directory comprises the Linux engine directories and file structures.

At 204, the database engine file directory and backup file are bundled. For example, existing database engine server 102 can compress database engine file directory 112 and backup file 114. In other embodiments, at 204, bundling can comprise placing the file directory and backup file (uncompressed) together in a folder or other container. In one embodiment, existing database engine server 102 comprises an Informix database server. Existing database engine server 102 can create an ontape.archive file, and bundle it with an Informix directory. In an embodiment, the bundled database engine file directory and backup file are communicated to repository server 104 and stored in memory 118.

At 206, the bundle is placed on a new database engine server. In an embodiment, script 124 commands new database engine server 106 to retrieve the bundle from repository server 104 and save it in memory 122 on new database engine server 106. In embodiments, wherein the bundling at 204 comprises compressing the bundle, placing the bundle at 206 further comprises uncompressing the bundle. In an embodiment, an initial (non-specialized) configuration of the server engine can be installed on the new database engine server using the database engine file directory and backup file.

At 208, at least one parameter of the new database engine server is determined. For example, script 124 can be configured to read existing hardware or software of new database engine server to determine at least one of a number of central processing units (CPUs), a total amount of memory 122 on new database engine server 106, a server name of new database engine server 106, or any other suitable characteristic for unique configuration of new database engine server 106.

At 210, at least one of the new database engine server parameters is updated based on the at least one parameter determined at 208. For example, script 124 can update one or more files or configuration settings utilized by the Informix engine to reflect the specific information of new database engine server 106. In an embodiment, updating at 210 further comprises updating at least one of an environment file, a host file, or a configuration file. Effectively, the database engine file directory and backup file can be adapted or fit to any size or configuration server. In another example of an Informix engine archive, onconfig and sqlhosts files can be modified to reflect the hardware of new database engine server 106.

At 212, the determined at least one parameter and the backup file are utilized to start the new database engine server. In embodiments, the determined at least one parameter and the backup file are utilized to lay out the Informix directory according to the particular configuration of new database engine server 106 hardware and software, as instructed by backup file 114. In an embodiment, an archive/restore is made to execute or initialize the Informix engine on new database engine server 106. In essence, the existing database engine server is restored on the new database engine server with specialized settings for the new database engine server. Advantageously, the new database engine server has no database tie or link to the existing database engine server.

At 214, the new database engine server is validated. For example, script 124 can command new database engine server 106 to cycle the Informix engine to validate the build.

In an embodiment, method 200 further comprises repeating the obtaining of 202, bundling of 204, placing, determining of 208, updating of 210, using of 212 and validating of 214 for another new database engine server, wherein the new database engine server and the another new database engine server have a standardized design.

Figure 3:
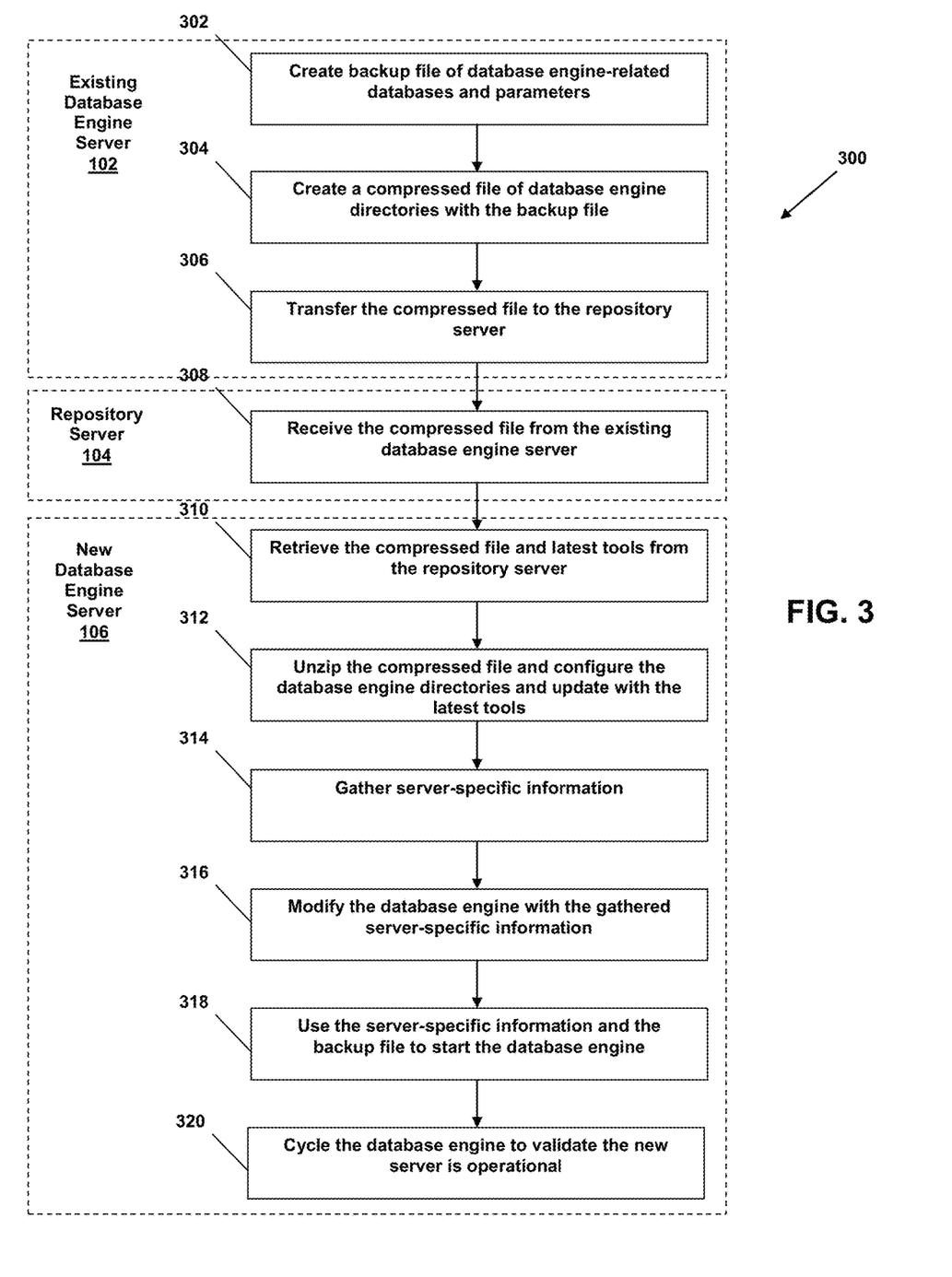
FIG. 3 is a flowchart of a method for automated configuration of a database engine server according to an embodiment.

Referring to FIG. 3, a flowchart of another method 300 for the automated configuration of a database engine server using system 100 of FIG. 1 is depicted, according to an embodiment. Existing database engine server 102, repository server 104, and new database engine server 106 are shown relative to the steps for which each is primarily responsible. Of course, handshaking or other interfacing or interaction is expected between the aforementioned components and steps, as depicted and described with respect to FIG. 1.

At 302, a backup file of database engine-related databases and parameters is created by existing database engine server 102. At 304, a compressed file of the backup file and database engine directories is created by existing database engine server 102. At 306, the compressed file is transferred to repository server 306 by existing database engine server 102.

At 308, the compressed file is received by the repository server 306. Subsequently, the compressed file is stored in repository server 306 memory in compressed or uncompressed form.

At 310, the compressed file and latest server tools are retrieved by new database engine server 106 from repository server. At 312, the compressed file is unzipped by new database engine server 106. New database engine server 106 is then configured with directories according to the data in the compressed file. Further at 312, the latest server tools previously retrieved are installed on new database engine server 106. At 314, specific information about new database engine server 106 is gathered. At 316, new database engine server 106 is modified with the gathered server-specific information. At 318, the server-specific information and the backup file are utilized to start the new database engine. At 320, the new database engine is cycled to validate that new database engine server 106 is operational.

Figure 4:
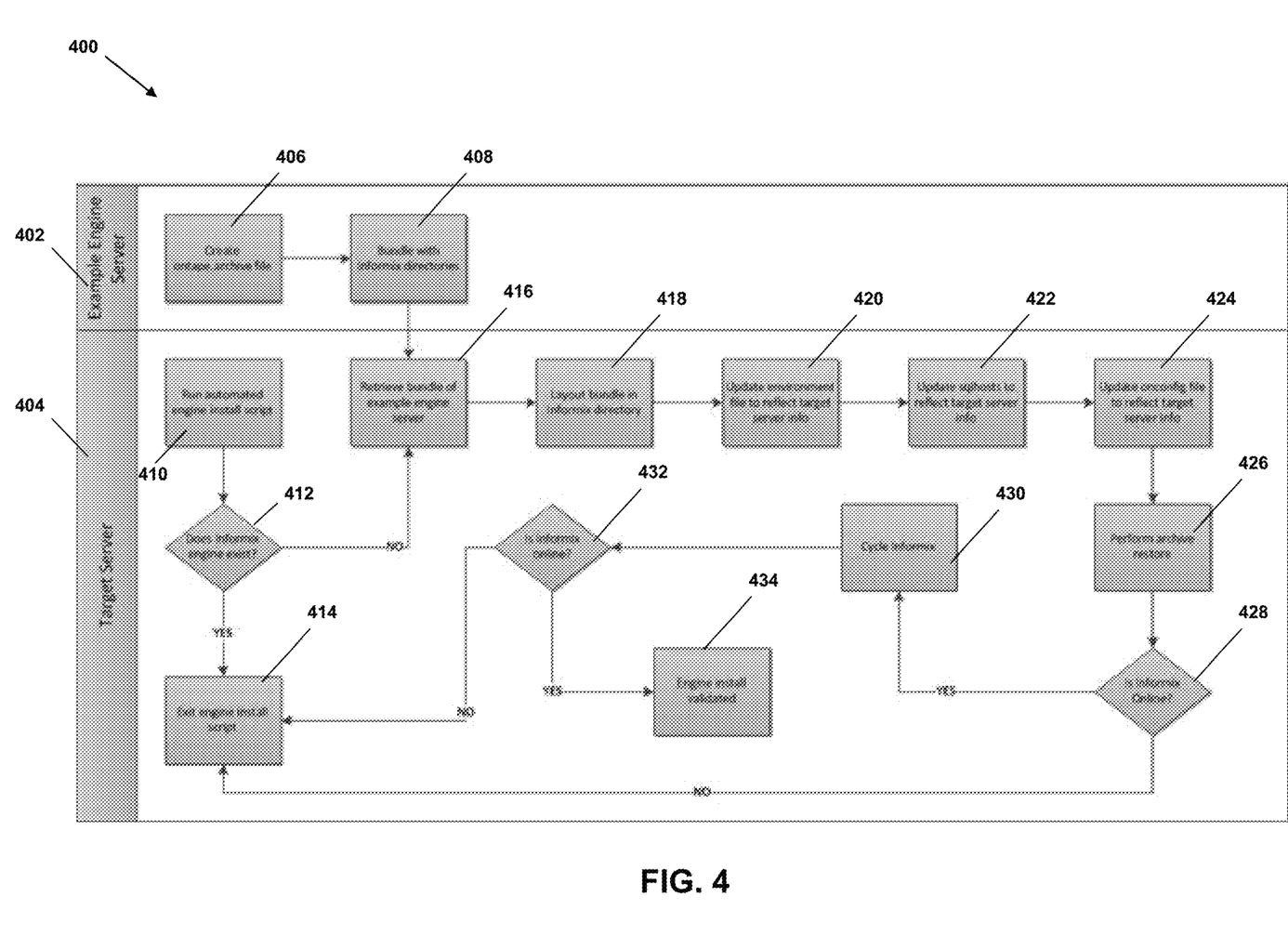
FIG. 4 is a flowchart of a method for automated configuration of a database engine server according to an embodiment.

Referring to FIG. 4, a flowchart of another method 400 for the automated configuration of a database engine server is depicted, according to an embodiment. Method 400 depicts a particular embodiment of an Informix server configuration. For ease of explanation, example existing engine server 402 and target server 404 are used instead of previous labels. However, one skilled in the art will readily appreciate that example existing engine server 402 can be substantially similar to existing database engine server 102, and target server 404 can be substantially similar to new database engine server 106, in embodiments.

As depicted, method 400 includes steps by existing engine server 402 and target server 404. However, a single script such as script 124 can command or execute the steps described herein on both existing engine server 402 and target server 404. In other embodiments, a first script can be executed on existing engine server 402 for the steps at existing engine server 402 and a second script can be executed on target server 404 for the steps at target server 404. In still other embodiments, one or more scripts can be executed at a separate networked device to interface with existing engine server 402 and target server 404 to command or otherwise execute the respective method steps.

At 406, a compressed file such as an ontape.archive file is created for existing engine server 402. In an embodiment, the ontape.archive file comprises a backup file for existing engine server 402. At 408, the ontape.archive file is bundled with Informix directory information.

At 410, an automated engine install script is executed by target server 404. At 412, a check is conducted to determine whether an Informix engine exists on target server 404. If an Informix engine already exists, method 400 exits the engine install script at 414. However, if an Informix engine does not exist on target server 404, the ontape.archive file and Informix directory information bundle packaged by existing engine server 402 is retrieved at 416. In an embodiment, a repository server (not shown) can be utilized as described herein.

At 418, the bundle is laid out or preliminarily installed on target server 404 according to the Informix directory information structures.

At 420-424, one or more configuration files are updated to reflect target server 404 information instead of existing engine server 402 information. At 420, an environment file is updated to reflect target server 404 information. Likewise, at 422, sqlhosts entries are updated to reflect target server 404 information. At 424, an onconfig file is updated to reflect target server 404 information.

At 426, an archive restore is conducted on target server 404 from the ontape.archive file created on existing engine server 402. The configuration files updated at 420-424 are utilized to tailor the archive restore to target server 404.

At 428, a check is conducted to determine if the Informix engine is online. In an embodiment, the check can be conducted by pinging the Informix engine over a network. In another embodiment, data can be test run through the Informix engine. In still other embodiments, a check for the continuity of required Informix engine networking files can be conducted to verify the Informix engine being online. One skilled in the art will readily appreciate that any number of online checks can be utilized at 428.

If the Informix engine is determined to not be online by the check at 428, the script has failed and method 400 exits engine install script at 414. However, if the Informix engine is determined to be online by the check at 428, the Informix engine is cycled at 430.

At 432, another check is conducted to determine if the Informix engine is online. As at 428, check 432 can be conducted in any number of ways.

If the Informix engine is determined to not be online by the check at 432, the script has failed and method 400 exits engine install script at 414. However, if the Informix engine is determined to be online by the check at 432, the Informix engine installation is deemed validated at 434.

Figure 5:
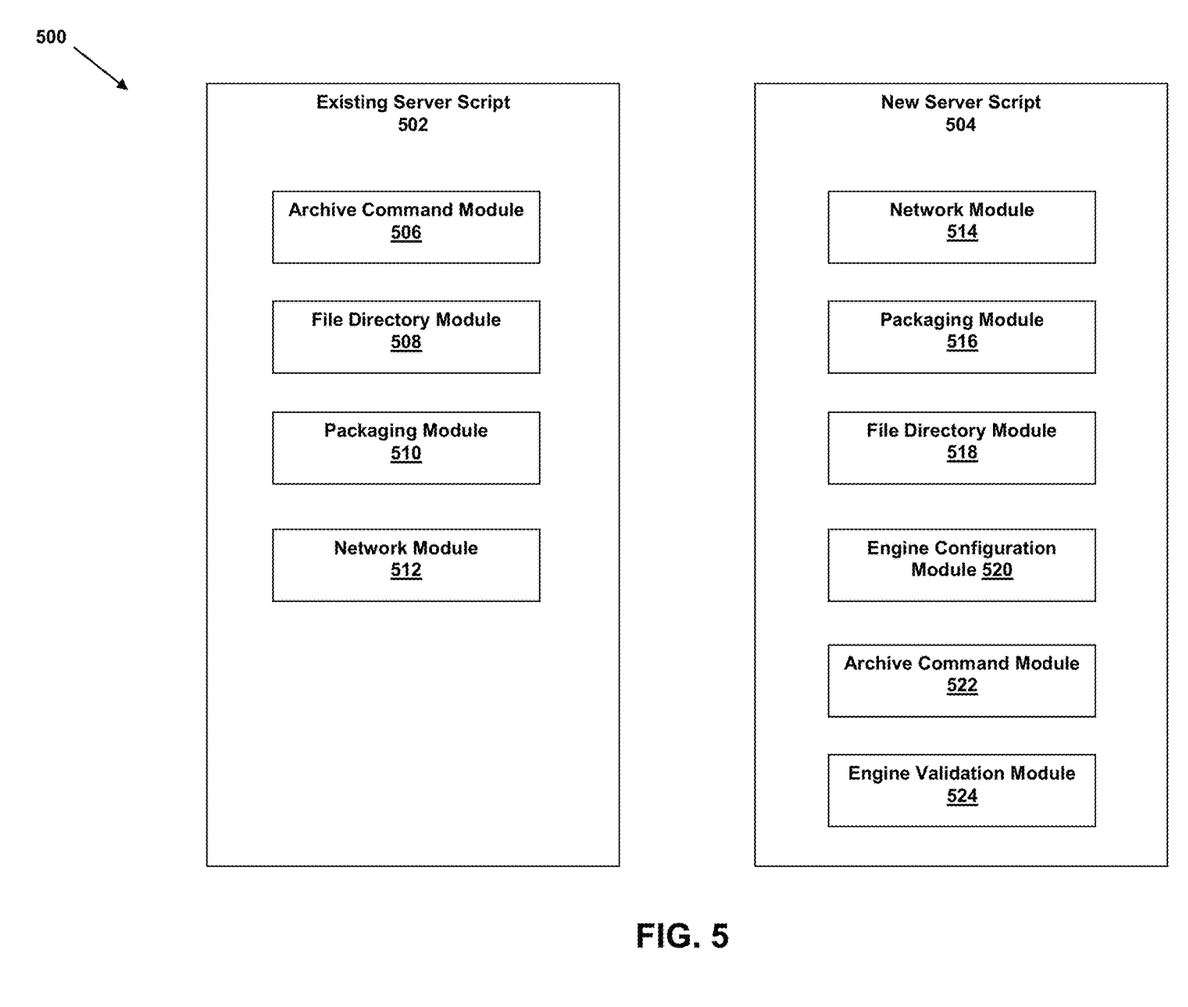
FIG. 5 is a block diagram of a system of scripts for the automated configuration of database engine servers according to an embodiment.

Referring to FIG. 5, a block diagram of a system 500 of scripts for the automated configuration of database engine servers is depicted, according to an embodiment. System 500 generally comprises an existing server script 502 and a new server script 504.

Existing server script 502 is configured to operate on or with an existing server engine, such as existing database engine server 102, referring to FIG. 1, or existing engine server 402, referring to FIG. 4. Existing server script 502 can be executed on, for example, existing database engine server 102 to generate an exportable package that can be used to configure another server. Existing server script 502 generally comprises an archive command module 506, a file directory module 508, a packaging module 510, and a network module 512.

Archive command module 506 comprises any suitable script, code, sub-engine, module, or other executable command to obtain an archive of the existing server engine. For example, archive command module 506 can command a preconfigured server application to generated an archive of the existing server engine.

File directory module 508 comprises any suitable script, code, sub-engine, module, or other executable command to retrieve the file directory of the existing server engine. In an embodiment, file directory module 508 can traverse existing server engine in order to obtain the desired file directory.

Packaging module 510 comprises any suitable script, code, sub-engine, module, or other executable command to package the archive obtained from archive command module 506 with the file directory obtained from file directory module 508. In an embodiment, the package can be compressed, encrypted, or otherwise manipulated for transfer over a network. For example, packaging module 510 can command a preconfigured server application to generated a compressed package of the archive and file directory.

Network module 512 comprises any suitable script, code, sub-engine, module, or other executable command to provide the package over a network to another networked device. For example, network module 512 can command preconfigured server network hardware and network software to transmit the package.

New server script 504 is configured to operate on or with a new server, such as new database engine server 106, referring to FIG. 1 or target server 404, referring to FIG. 4. New server script can be executed on, for example, new database engine server 106 to configure new database engine server 106 according to the standardized layout and design of existing database engine server 102. New server script 504 generally comprises a network module 514, a packaging module 516, a file directory module 518, an engine configuration module 520, an archive command module 522, and an engine validation module 524.

Network module 514 comprises any suitable script, code, sub-engine, module, or other executable command to receive the packaged archive and file directory generated by existing server script 502. In an embodiment, network module 514 can command the new server to retrieve the packaged archive and file directory from the existing server. In another embodiment, network module 514 can command the new server to retrieve the packaged archive and file directory from a repository server.

Packaging module 516 comprises any suitable script, code, sub-engine, module, or other executable command to unpack the retrieved package. For example, packaging module 516 can uncompress and unpack the single package into archive data structure and a file directory data structure.

File directory module 518 comprises any suitable script, code, sub-engine, module, or other executable command to set up the file directory on the new server in accordance with the retrieved file directory data structure. For example, file directory module 518 can build folders, sub-folders, and file structures mirroring that of the retrieved file directory data structure.

Engine configuration module 520 comprises any suitable script, code, sub-engine, module, or other executable command to update one or more configuration files to reflect the new server information instead of the existing engine server information that was packaged in the archive. For example, engine configuration module 520 can open configuration files, make edits to those files to reflect the new server information, and save the configuration files. In other embodiments, other data structures storing server-specific information can be similarly edited and saved. In other embodiments, engine configuration module 520 can update the file directory structure initially laid out by file directory module 518.

Archive command module 522 comprises any suitable script, code, sub-engine, module, or other executable command to perform an archive restore from the archive data structure. For example, archive command module 522 can command a preconfigured server application to restore the archived data structure settings into the new server to effectively generate a new server engine.

Engine validation module 524 comprises any suitable script, code, sub-engine, module, or other executable command to validate the new server settings. In an embodiment, engine validation module 524 comprises commands to verify the new server engine is online. In an embodiment, engine validation module 524 comprises commands to cycle the new server engine.

Thus, embodiments greatly reduce the amount of time to build a server engine on a new server using automation based on actual server configuration with limited manual steps. For example, embodiments described herein can build an Informix engine on a new server in only a few minutes, including the time to copy the bundle to the new server. This allows for the rapid deployment of many server engines.

Additionally, because new server engines are built with a standardized layout and configuration, all new database engine servers built with the same script will be consistent in design. A uniform design is therefore achieved.

Embodiments can be implemented or executed without deep, specialized knowledge of the software, hardware, or installation process. Effectively, the scripts and server manipulation described herein can be executed by any installation team member, even those with little server engine installation experience.

Further, the server engine installation checklist is greatly reduced. As a result, potential human error is reduced, as is the potential for installing the system in a non-optimized state. Server operation and system operation are therefore improved over traditional system installations.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. §112(f) are not to be invoked unless the specific terms "means for" or "step for" are recited in a claim.

The invention claimed is:

1. A method for automated configuration of a new database engine server comprising:
obtaining, from an existing database engine server, a database engine file directory and a backup file comprising database engine parameters and at least one database related to the existing database engine server;
bundling the obtained database engine file directory and backup file to create a bundle;
placing the bundle on a new database engine server such that the new database engine server contains the database engine parameters and the at least one database, wherein a new database engine on the new database engine server is previously unstarted;
determining at least one parameter of the new database engine server;
updating at least one of the database engine parameters based on the determined at least one parameter to create a copy of the existing database engine server tailored by the determined at least one parameter to particular hardware and software of the new database engine server as a tailored copy;
using the determined at least one parameter and the backup file from the bundle on the new database engine server to start the new database engine such that the existing database engine is restored according to the tailored copy on the new database engine server; and
validating the new database engine server.

2. The method of claim 1, wherein the validating further comprises cycling the new database engine.

3. The method of claim 1, wherein the bundling further comprises compressing the bundle, and wherein the placing further comprises uncompressing the bundle.

4. The method of claim 3, further comprising:
transferring the compressed bundle from the existing database engine server to a repository server,
wherein the placing further comprises transferring the compressed bundle from the repository server to the new database engine server.

5. The method of claim 1, wherein the determining comprises determining at least one of a number of central processing units (CPUs), a total amount of memory, or a server name of the new database engine server.

6. The method of claim 1, wherein the back-up file further comprises at least one database related to the existing database engine server.

7. The method of claim 1, wherein the updating further comprises updating at least one of an environment file, a host file, or a configuration file.

8. The method of claim 1, further comprising repeating the obtaining, bundling, placing, determining, updating, using and validating for another new database engine server, wherein the new database engine server and the another new database engine server have a standardized design.

9. A system for automated configuration of a new database engine server comprising:
an existing database engine server comprising a database engine file directory and a backup file comprising database engine parameters and at least one database related to the existing database engine server and configured to bundle the database engine file directory and the backup file;
a repository server communicatively coupled with the existing database engine server to receive the bundled database engine file directory and backup file; and
a new database engine server communicatively coupled with the repository server to retrieve the bundled database engine file directory and backup file such that the new database engine server contains the database engine parameters and the at least one database, wherein a new database engine on the new database engine server is previously unstarted, and the new database engine server configured to determine at least one parameter of the new database engine server, update at least one of the database engine parameters based on the determined at least one parameter to create a copy of the existing database engine server tailored by the determined at least one parameter to particular hardware and software of the new database engine server as a tailored copy, such that the existing database engine is restored on the new database engine server according to the tailored copy, and use the determined at least one parameter and the backup file to start operation of the new database engine.

10. The system of claim 9, wherein the new database engine is further configured to be cycled to validate operation.

11. The system of claim 9, wherein the existing database engine server is configured to compress the bundled database engine file directory and backup file, and wherein the new database engine server is configured to uncompress the bundled and compressed database engine file directory and backup file.

12. The system of claim 9, wherein the at least one parameter of the new database engine server comprises at least one of a number of central processing units (CPUs), a total amount of memory, or a server name of the new database engine server.

13. The system of claim 9, wherein the back-up file further comprises at least one database related to the existing database engine server.

14. The system of claim 9, wherein the new database engine server is configured to update at least one of an environment file, a host file, or a configuration file.

15. A system for automated configuration of a server engine, the system comprising:
a first script including instructions that when executed on a first computing platform including first computing hardware of at least one first processor, a first memory operably coupled to the at least one first processor and configured to store instructions invoked by the at least one first processor, a first operating system implemented on the first computing hardware, and first input/output facilities, cause the first computing platform to implement:
an archive module configured to generate a backup file of the first computing platform comprising first computing platform parameters and at least one database related to the existing database engine server,
a file directory module configured to generate a file directory of the first computing platform, and
a packaging module configured to package the backup file and the file directory into a first computing platform package; and
a second script including instructions that when executed on a second computing platform including second computing hardware of at least one second processor, a second memory operably coupled to the at least one second processor and configured to store instructions invoked by the at least one second processor, a second operating system implemented on the second computing hardware, and second input/output facilities, cause the second computing platform to implement:
an unpackaging module configured to unpackage the first computing platform package such that the second memory contains the database engine parameters and the at least one database,
a file directory module configured to build a file directory structure on the second computing platform according to the file directory,
an engine configuration module configured to update the first computing platform parameters for the second computing platform to second computing platform parameters, wherein a second computing platform engine on the second computing platform is previously unstarted, and
an archive command module configured to perform an archive restore from the backup file of the first computing platform using the second computing platform parameters to create a copy of the first computing platform tailored by the second computing platform parameters to particular hardware and software of the second computing platform as a tailored copy, such that the first computing platform is restored on the second computing platform according to the tailored copy and the second computing platform engine is started.

16. A system for automated configuration of a server engine of claim 15, wherein the first script further comprises instructions that cause the first computing platform to implement a first network module configured to transmit the first computing platform package, and
wherein the second script further comprises instructions that cause the second computing platform to implement a second network module configured to obtain the first computing platform package.

17. A system for automated configuration of a server engine of claim 15, wherein the second script further comprises instructions that cause the second computing platform to implement an engine validation module configured to verify the second computing platform is online.

18. A system for automated configuration of a server engine of claim 16, wherein the engine validation module is further configured to cycle the second computing platform engine.

19. A system for automated configuration of a server engine of claim 15, wherein the packaging module is further configured to compress the first computing platform package and the unpackaging is further configured to uncompress the first computing platform package.

* * * * *